No. 756,759.

Patented April 5, 1904.

UNITED STATES PATENT OFFICE.

HERMANN WOLF, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

COMPOSITION OF MATTER AND PROCESS OF PRODUCING SAME.

SPECIFICATION forming part of Letters Patent No. 756,759, dated April 5, 1904.

Application filed April 24, 1901. Serial No. 57,294. (No specimens.)

*To all whom it may concern:*

Be it known that I, HERMANN WOLF, chemist, a subject of the Emperor of Austria-Hungary, residing at Ludwigshafen-on-the-Rhine, in the Kingdom of Bavaria, Germany, have invented new and useful Improvements in a new Composition of Matter and Process of Producing the Same, of which the following is a specification.

In the specifications of United States Letters Patent Nos. 662,338, 662,339, and 711,377 there is described the production of solid hydrosulfites and means whereby they can be obtained in a very dry condition by suitably washing with acetone, alcohol, and ether. In this way they are rendered more stable than any form of hydrosulfite before known. For many purposes, however, it is desirable that a product should be obtainable which, while possessing the advantages of the above-mentioned solid hydrosulfites—such as purity, concentration, and convenience of use—should be still more stable, thus enabling it to be kept longer without deteriorating and making it, for instance, more suitable for export. My present invention relates to a composition of matter containing hydrosulfite which fulfils these conditions.

The deterioration of hydrosulfites is due to their being readily changed by oxidation and to their being susceptible to an internal change of composition whereby salts result which are useless for the purposes of reduction. For instance, thiosulfates are formed. Experience has shown that hydrosulfite salts dried in the air and which still contain water of crystallization or air or other gas containing free oxygen inclosed in their mass are not with certainty prevented from deteriorating merely by inclosing them in air-tight vessels, but may change wholly or in part to sulfites, thiosulfites, sulfur dioxid, sulfates, and the like.

I have discovered that the hydrosulfite salts which have hitherto been obtained in the solid state and which contain water of crystallization lose the same on leaving them for a sufficient time in a vacuum in the presence of a desiccating agent—for example, concentrated sulfuric acid—and that in this anhydrous state they are considerably less liable to the aforementioned internal or intramolecular decomposition than hydrosulfite salts containing water of crystallization. Further, it would seem that the cause of air-dried hydrosulfite salts undergoing oxidation, even when inclosed in air-tight vessels, is in the main due to the salts at the moment of becoming dry condensing a film of air on their surface, which air they carry with them when filled into the said vessels and which then exerts its oxidizing influence more or less quickly, according to the conditions obtaining at the time. I have discovered that this oxidation may be practically entirely avoided, or at any rate avoided for a considerable length of time, if after drying the salts in vacuum, as aforesaid, a dry inert gas free from oxygen—such as nitrogen, deoxygenated illuminating-gas, hydrogen, and the like—be allowed to flow into the vacuum. The salt is then filled into air-tight vessels and sealed, care being taken that the operations are performed quickly and contact with the air avoided as much as possible. The product so obtained is essentially a mixture of a hydrosulfite salt and an inert gas, for having regard to the present state of knowledge I believe I am justified in considering that a film of the inert gas condenses on the surface of the salt and protects the same from further oxidation, as during the short time in which the salt is in contact with the air while being inclosed in air-tight vessels no appreciable amount of diffusion or displacement of the inert gas condensed on the surface takes place.

The gas that I more especially find useful for this purpose is illuminating-gas free from oxygen, and the hydrosulfite salt which I particularly wish to mix with the same is zinc-sodium hydrosulfite.

According to my present invention I collect the solid hydrosulfites from their mother-liquors by pressing, and the press-cake is introduced into a vacuum, (previously freeing it or not from the contained mother-liquor by washing with alcohol or acetone and removing this with ether.) In this vacuum the remaining water or washing agent evaporates, and the hydrosulfite is thoroughly dried in the presence of a drying agent, such as concentrated sulfuric acid. When completely dried, the vacuum is filled by an inert gas, such as nitrogen or other available gas free from oxygen. An equivalent method of producing this result consists in treating the hydrosulfites either in the form of the press-cake direct or, after washing with alcohol or the like, in a stream of dry indifferent gas—for instance, nitrogen. This drying operation is continued until the water of crytallization is entirely removed, and the product is then inclosed in an air-tight vessel.

The product which can be obtained by either of the above-described methods is characterized by being more stable than any hydrosulfite product yet known. In the absence of gas exerting an oxidizing action it will remain practically unchanged for one year at least, which is the greatest length of time I have yet had for testing its keeping properties.

The following examples will serve to further illustrate the nature of this invention and the manner in which it may be carried into practical effect; but the invention is not limited to the details therein given. The parts are by weight.

Example 1: Wash ten (10) parts of one of the hydrosulfite double salts obtainable in accordance with the specification of Letters Patent No. 662,338 or No. 662,339 with five (5) parts of alcohol, so as to free it from the mother-liquor and displace the alcohol by washing with three (3) parts of ether. Remove the water of crystallization of the salt by drying in vacuum over sulfuric acid or other suitable drying agent, and when completely dry allow nitrogen or other inert gas free from oxygen—for example, illuminating-gas—to flow into the vacuum.

Example 2: Prepare calcium hydrosulfite in the known manner. Press and free it from adhering mother-liquor by washing with alcohol or acetone. Displace the alcohol, if desired, by washing with ether. Completely dry the calcium salt in vacuum and then allow nitrogen to flow into the same. Fill the dry salt into drums which can be hermetically sealed.

Example 3: Press a quantity of zinc-sodium hydrosulfite and bring the press-cake either at once or after having freed it from mother-liquor by washing with alcohol into a rotating cylinder. Dry it and free it from water of crystallization by passing a stream of dry nitrogen free from oxygen through the cylinder and fill the dried salt into suitable vessels.

Now what I claim is—

1. The new article of manufacture which consists of a hydrosulfite salt enveloped by an inert gas.

2. The new article of manufacture which consists of an anhydrous hydrosulfite salt enveloped by an inert gas.

3. The new article of manufacture which consists of an anhydrous hydrosulfite salt enveloped by illuminating-gas which does not contain free oxygen.

4. The new article of manufacture which consists of anhydrous zinc-sodium hydrosulfite enveloped by illuminating-gas which does not contain free oxygen.

5. The process of obtaining a stable hydrosulfite body which consists in completely freeing a hydrosulfite body from water by pressing it and drying it *in vacuo* and surrounding the hydrosulfite body with an inert gas.

6. The process of obtaining a stable hydrosulfite body which consists in completely freeing a hydrosulfite body from water by pressing it and drying it *in vacuo* and surrounding the hydrosulfite body with illuminating-gas free from oxygen.

7. The process of obtaining a stable hydrosulfite body which consists in completely freeing zinc-sodium hydrosulfite from water by pressing it and drying it *in vacuo* and surrounding the zinc-sodium hydrosulfite body with illuminating-gas free from oxygen.

In testimony whereof I have hereunto set my hand in the presence of two subscribing witnesses.

HERMANN WOLF.

Witnesses:
ERNEST F. EHRHARDT,
JACOB ADRIAN.